Dec. 19, 1961  G. BONMARTINI  3,013,623
PARKING DEVICE FOR VEHICLES
Filed Dec. 8, 1959  4 Sheets-Sheet 1

Dec. 19, 1961  G. BONMARTINI  3,013,623
PARKING DEVICE FOR VEHICLES
Filed Dec. 8, 1959  4 Sheets-Sheet 2

Dec. 19, 1961  G. BONMARTINI  3,013,623
PARKING DEVICE FOR VEHICLES
Filed Dec. 8, 1959  4 Sheets-Sheet 3

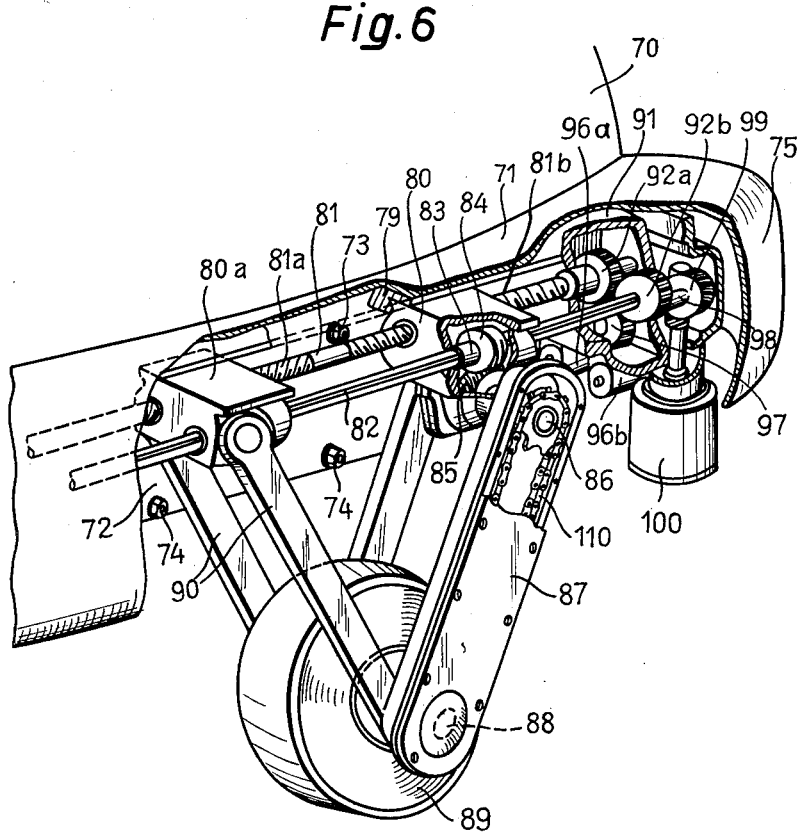

United States Patent Office 3,013,623
Patented Dec. 19, 1961

3,013,623
PARKING DEVICE FOR VEHICLES
Giovanni Bonmartini, 2 Via San Teodoro, Rome, Italy
Filed Dec. 8, 1959, Ser. No. 858,081
3 Claims. (Cl. 180—1)

This invention relates to a parking device for vehicles.

The increase in vehicle traffic makes parking a serious problem. At times space enough is available to receive the vehicle but access thereto is practically impossible by ordinary steering means.

A first object of this invention is to provide an attachment by which a vehicle can be easily parked even in a space just slightly exceeding the longitudinal dimension of the vehicle.

Another object of this invention is to provide a parking attachment enabling the driver to control the parking operation simply by depressing the accelerator pedal.

Still another object of this invention is to provide a parking attachment which is sturdy and can be fitted to the vehicle without any modification of the vehicle.

An object of this invention is to provide a parking attachment comprising a supporting frame adapted to act as a bumper which can be easily and quickly fitted to the vehicle in lieu of one of the existing bumpers.

Another object is to provide a parking attachment for vehicles capable of serving as an effective theft-proof device thereon.

The above and any other objects will be clearly understood from the appended detailed description with reference to the accompanying drawings wherein:

FIG. 6 is a perspective view partly in section of the parking attachment, according to the invention, in its operative position;

Figure 1:
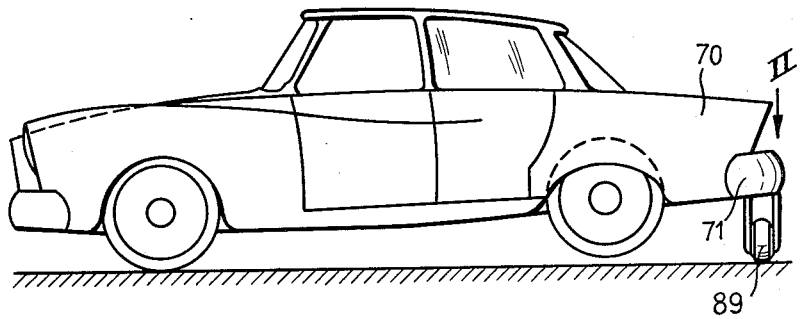
FIG. 1 is a side elevation view of a car equipped with a parking attachment, according to the invention.
Figure 5:
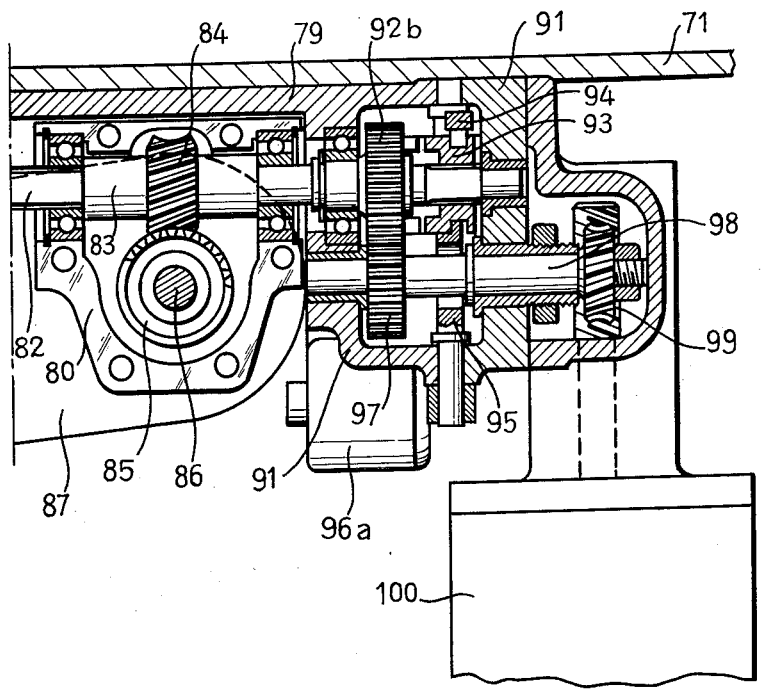
FIG. 5 is a detail view on an enlarged scale of a portion of FIG. 3.
Figure 2:
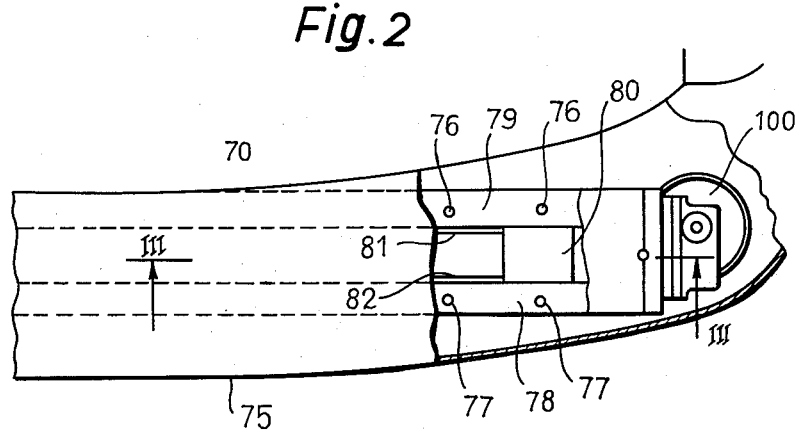
FIG. 2 is a fragmentary plan view partly in section of the attachment or device taken on a plane corresponding to an arrow II of FIG. 1.

According to the drawings a rear body portion 70 of a car has fitted thereto, in lieu of the conventional bumper, a rear bumper member 71 incorporating the parking attachment.

The bumper 71 comprises a channelled section metal supporting frame having a flange 72 which serves for securing the bumper to the car body. Attachment to the vehicle is effected by means of nuts 73, 74 threaded on body bolts fast with the car structure as are provided thereon for attachment of the conventional bumper.

Figure 3:
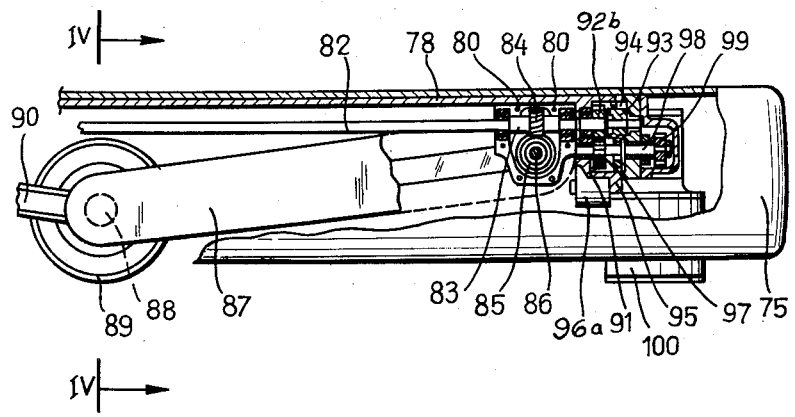
FIG. 3 is an elevation view partly in section taken on line III—III of FIG. 2 showing the parking attachment in its inoperative position.
Figure 4:
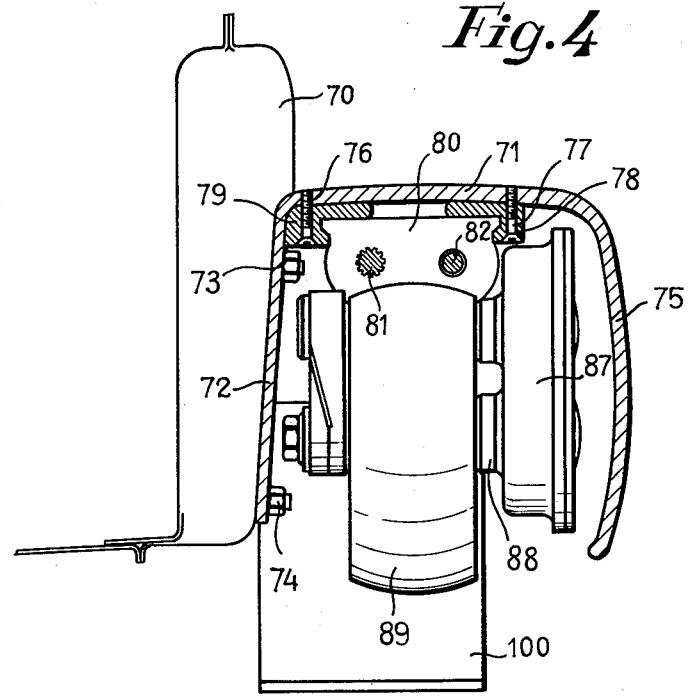
FIG. 4 is a partly sectional view on an enlarged scale taken on line IV—IV of FIG. 3.

An opposite flange 75 of the bumper 71 is conveniently curved, as shown in FIG. 3, to suit the rear contour of the car body. Both the flange 75 and a web extending between the flanges of the supporting frame can be conveniently chrome-plated and polished on their exposed surface for appearance.

Two guideways 78, 79 are secured within the bumper to the web between the flanges 72, 75, for example by screws 76, 77 and have slidable thereon travelling slides 80, 80a. The slides 80, 80a are displaced along the longitudinal axis of the guideways by rotation of a shaft 81 having right-hand and left-hand screw threaded sections 81a, 81b, threaded in screw-threaded portions in the slides 80, 80a, respectively.

A splined shaft 82 extends parallel to the threaded shaft 81 and guideways 78, 79. The splined shaft 82 transmits motion to a bushing 83 having keyed thereto a worm screw 84. The bushing 83 is axially movable along the splined shaft 82 within the slide 80. The worm screw 84 meshes with a worm gear 85 rotatable about a pivot 86 for speed reducing purposes. The gear 85 drives a sprocket chain drive 110 incorporated in an arm 87 pivotal about the pivot 86. The chain drive rotates a roller 89 about a pivot 88 which forms an axis for rotation normal to the axis of rotation of the vehicle rear wheels and is supported on a free end of the arm 87.

The arm 87, cooperates with connecting rods 90 hinged to the free end of the arm to act as a toggle mechanism. The connecting rods 90 are pivotally hinged at their opposite other end to the travelling slide 80a.

A casing 91 fast with the bumper 71 is arranged at one end of the guideways 78, 79. Both the double-thread shaft 81 and the splined shaft 82 extend into this casing.

A toothed wheel or gear 92b is loosely mounted on the splined shaft 82 and is coupled to the shaft by a coupling 93 axially slidable on the shaft. The coupling or clutch 93 is moved by a lever 94 fast with a rod 95 in order to clutch in the gear 92b. A completely similar arrangement including a gear 92a is provided on the shaft 81 arranged parallel with the shaft 82.

Rods, for example rod 95 clutching and declutching the gears 92a, 92b rotatably keyed to the shafts 81 and 82 are controlled by two electromagnets or solenoids 96a, 96b.

Another gear 97 meshes with the gears 92a, 92b on the shafts 81 and 82. The gear 97 is keyed to a shaft 98 rotatably driven through a gear 99 which is itself driven from the threaded shaft of a reversible electric motor 100 mounted in the bumper. The gears 92a, 92b are driven by the gear 97 but are effectively coupled to their respective shafts for imparting rotation thereto under control of the respective solenoids.

The double-thread shaft 81 and splined shaft 82 are both protected against dust and water splashes by a sheath which can be made of rubber or any other suitable material and is bellows-shaped (not shown). The opposite ends of the sheath are secured to the travelling slides 80, 80a of the toggle mechanism. The sheath permits axial travel of the slides since it functions similar to a bellows.

Figure 7:
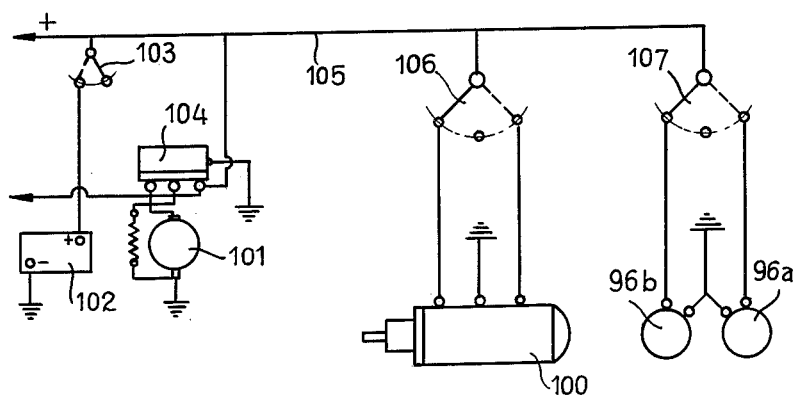
FIG. 7 is a schematic diagram illustrating the electrical circuit for energizing a driving electric motor and electro-mechanical controls for the parking attachment.

Referring to FIG. 7, the electric circuit controlling the parking attachment comprises a generator 101 which may be the generator associated with the internal combustion engine on the vehicle. The generator is connected in parallel with a storage battery 102. The circuit of the storage battery 102 includes a cut-out switch 103.

The generator 101 supplies current through a current distributor 104 to a lead 105 energizing both the motor 100 and the electromagnets 96a, 96b arranged to couple the double-thread shaft 81 and splined shaft 82, respectively to the motor.

The energizing circuit for the motor 100 includes a change-over switch 106 for reversibly operating the motor. The circuit for energizing the electromagnets 96a, 96b includes a change-over switch operable to positions for energizing either electromagnet selectively and separately.

The parking attachment operates as follows:

In order to lower the roller 89 to the surface of the ground, the switch 103 is operated to a position for switching off the storage battery 102 and placing the generator 101 directly in circuit with the energizing circuit for the motor 100 and the clutching electromagnets 96a and 96b. When the change-over switches 106, 107 are in their proper operative positions so that the circuit is completed, for example, through the leads shown as solid lines or broken lines in the diagram of FIG. 7 the relay 96a is energized and it effectively couples the gear 92a with the threaded shaft 81. Current is subsequently applied to the motor through a proper manipulation of the switch 106. The motor rotates the threaded shaft and operates the toggle mechanism.

The toggle mechanism extends for lowering the wheel or roller 89 by displacement of the slides along the guideways 78, 79 toward each other because of the direction of rotation of the threaded shaft 81. The slides have secured thereto the arm 87 and connecting rods 90, respectively, so that the slides upon being moved in a direction toward each other by the threaded shaft 81 the toggle mechanism is extended.

The roller 89 thereby comes into contact with the ground and lifts the rear portion of the car. The electromagnet 96b is subsequently operated by operating the switch 107 to the position in which it is shown in FIG. 7 and clutches in the splined shaft 82, whereby rotational motion is transmitted by the motor 100 to the worm screw 84, thereupon to the gear 85 which rotates the roller 89 through the chain drive 110 thereby moving the car sidewise.

An automatic stop switch (not shown) operated by the slides disconnects the electromagnet 96a as the slides reach the end of their travel.

Once the roller has been lowered the car bears on three supporting points, namely the front wheels and roller. This is a statically determined condition so that the car is not subjected to any tilting moment.

During operation of the parking attachment the internal combustion engine on the car is kept running, the necessary electric current for operation of the parking attachment is supplied by the generator 101. The storage battery 102 is cut off from the electric circuit by means of the switch 103, as mentioned above. The switch 103 is of the key-operated type and can be locked in its operative position switching off the storage battery, whereby the car is effectively made theft-proof by cutting out the electric circuit thereon and safety is afforded against any short-circuiting that may occur during parking.

By energizing the motor 100 from the generator 101 driven by the engine on the car the current for the motor 100, hence the rotational speed of the motor, can be adjusted by control of the accelerator pedal. The result is great ease in operation, since the driver is accustomed to control the power output from the engine of the car engine by depressing the accelerator pedal.

Moreover, switching off the storage battery from the circuit for energizing the parking attachment avoids subjecting the battery to considerable stresses inherent in the operation of the parking attachment and which might readily lead to discharge thereof, thereby improving the life of the battery.

As mentioned above the motor 100 is of the reversible type for the purpose of carrying out the parking operation and is operated in reverse for restoring the roller to its inoperative or retracted position.

Although I have shown and described a specific construction, I want it to be understood that my invention is not limited to the details set forth.

The basic features of my invention may be mechanically exemplified in other forms than herein set forth without departing from the scope of the invention as defined in the appended claims.

I claim:

1. In a four-wheeled motor vehicle having an engine the rate of speed of which is variably controlled by the vehicle operator and an electrical circuit including a storage battery energized from a generator driven by the engine at variable speeds, said generator having a variable current output in dependence upon the speed at which it is driven, a parking attachment comprising a supporting structure attached to a rear portion of the vehicle and arranged to act as a rear bumper, an arm extending transversely of the vehicle pivotally secured at one end to said structure and carrying on its free end a roller having its axis extending perpendicular to the axis of rotation of the rear vehicle wheels when said attachment is attached to the vehicle, said arm having a length such that the length from its pivotal point plus the length of the radius of the roller is a distance greater than the distance from said pivotal point to the surface of the ground, a reversible electric motor mounted on said structure, first means for pivotally actuating said arm for causing said roller to make contact with the ground surface at a region in the vertical plane extending through the longitudinal axis of the vehicle to thereby lift the rear portion of the vehicle, second means for rotating said roller selectively and moving said vehicle sidewise while in its lifted condition, clutch means for selectively operably connecting said first and second means alternatively with said electric motor for driving therefrom, and electromagnetic controls for actuating said clutch means energized by said generator thereby to variably control the speed at which said arm is lowered and the rotational speed of the roller in dependence upon the speed of the engine on the vehicle.

2. In a four-wheeled motor vehicle according to claim 1, including electrical equipment connected to said electrical circuit, said circuit comprising key-operated switch means for electrically connecting said generator alternatively to said motor for energizing the motor and for connecting said generator to said battery and electrical equipment.

3. A parking device for four-wheeled motor vehicles, comprising a supporting frame having means to secure it to the rear of a vehicle arranged to act as a bumper, a rockable arm pivotally supported at one end inside said frame, a roller rotatably supported on the free end of said arm and having means defining its axis of rotation extending normal to the axes of the vehicle rear wheels, said arm and roller being positionable in a retracted position inside said frame, said arm having a length such that the distance between the axis of oscillation of said arm and the axis of said roller plus the radius of the roller is greater than the distance from said axis of oscillation to the surface of the ground, means carried by said frame for rotating said arm and said roller downwardly sufficiently to cause said roller to make contact with the ground surface and thereby lift the rear wheels of the vehicle off the ground and for rotating said arm and roller thereon back to their starting retracted position, the last-mentioned means comprising a reversible motor carried by said supporting frame, a threaded shaft driven by said motor disposed parallel to said arm and rotatably supported in said frame, said shaft having two opposite screw threads extending axially over separate portions of the threaded shaft, a pair of travelling slides held against rotation and supported by said frame for displacement axially along said shaft, each of said slides having a thread engaging a respective one of said threads on said shaft thereby in operation being displaced axially on said threaded shaft upon rotation of said threaded shaft, a pivot on one of said slides for pivotally supporting said arm, a connecting rod pivotally secured at one end to the other of said slides and having its other end pivotally secured to said arm at a point near the axis of rotation of said roller, whereby upon rotation of said threaded shaft in one direction said slides travel in a direction toward each other and said roller is lowered and upon rotation of said threaded shaft in an opposite direction said slides are moved apart and said roller is lifted and retracted inside said frame, a splined shaft parallel to said threaded shaft rotatably supported in said frame and extending through said slides to keep them from rotation with said threaded shaft, means driven by said splined shaft for selectively driving said roller in either of two directions when in a lowered position, and means for selectively and alternatively driving from the motor said threaded and splined shafts each in both directions.

References Cited in the file of this patent

UNITED STATES PATENTS

| | | |
|---|---|---|
| 1,884,932 | Walker | Oct. 25, 1932 |
| 1,990,150 | Walker | Feb. 5, 1935 |

FOREIGN PATENTS

| | | |
|---|---|---|
| 793,248 | France | Nov. 16, 1935 |
| 537,726 | Germany | Nov. 6, 1931 |
| 219,248 | Great Britain | July 24, 1924 |

UNITED STATES PATENT OFFICE

CERTIFICATE OF CORRECTION

Patent No. 3,013,623                  December 19, 1961

Giovanni Bonmartini

It is hereby certified that error appears in the above numbered patent requiring correction and that the said Letters Patent should read as corrected below.

In the heading to the printed specification, between lines 4 and 5, insert the following:

Claims priority, application Italy Feb. 6, 1959

Signed and sealed this 16th day of October 1962.

(SEAL)
Attest:

ERNEST W. SWIDER
Attesting Officer

DAVID L. LADD
Commissioner of Patents